(12) United States Patent
Hosokawa et al.

(10) Patent No.: US 12,500,314 B2
(45) Date of Patent: Dec. 16, 2025

(54) BATTERY

(71) Applicant: PRIME PLANET ENERGY & SOLUTIONS, INC., Tokyo (JP)

(72) Inventors: Takafumi Hosokawa, Himeji (JP); Takashi Hosokawa, Kako-gun (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 657 days.

(21) Appl. No.: 17/820,431

(22) Filed: Aug. 17, 2022

(65) Prior Publication Data

US 2023/0064832 A1 Mar. 2, 2023

(30) Foreign Application Priority Data

Aug. 24, 2021 (JP) .................................. 2021-136558

(51) Int. Cl.
| | |
|---|---|
| *H01M 50/538* | (2021.01) |
| *H01M 4/13* | (2010.01) |
| *H01M 10/0587* | (2010.01) |
| *H01M 50/103* | (2021.01) |
| *H01M 50/15* | (2021.01) |
| *H01M 50/533* | (2021.01) |
| *H01M 50/534* | (2021.01) |
| *H01M 50/586* | (2021.01) |
| *H01M 50/593* | (2021.01) |
| *H01M 4/02* | (2006.01) |

(52) U.S. Cl.
CPC ........... *H01M 50/538* (2021.01); *H01M 4/13* (2013.01); *H01M 10/0587* (2013.01); *H01M 50/103* (2021.01); *H01M 50/15* (2021.01); *H01M 50/533* (2021.01); *H01M 50/534* (2021.01); *H01M 50/586* (2021.01); *H01M 50/593* (2021.01); *H01M 2004/027* (2013.01); *H01M 2004/028* (2013.01)

(58) Field of Classification Search
CPC .. H01M 50/538; H01M 50/586; H01M 50/50; H01M 50/533; H01M 50/534
See application file for complete search history.

(56) References Cited

U.S. PATENT DOCUMENTS

| | | | | |
|---|---|---|---|---|
| 2001/0021471 | A1* | 9/2001 | Xing | H01M 4/13 |
| | | | | 429/162 |
| 2008/0118825 | A1* | 5/2008 | Yoon | H01M 10/058 |
| | | | | 429/122 |
| 2010/0143773 | A1* | 6/2010 | Honbou | H01M 10/425 |
| | | | | 429/94 |

(Continued)

FOREIGN PATENT DOCUMENTS

| | | |
|---|---|---|
| CN | 111512485 A | 8/2020 |
| JP | 2010-135170 A | 6/2010 |

(Continued)

*Primary Examiner* — Kenneth J Douyette
(74) *Attorney, Agent, or Firm* — Finnegan, Henderson Farabow, Garrett and Dunner LLP

(57) ABSTRACT

A battery, in which a damage on an electrode tab group is suitably inhibited, is provided. The herein disclosed battery satisfies D1>D2 in the case where a length of an interval from a first end part existing in a surface direction along the first side wall to a positive electrode tab join part is treated as D1 and a length of an interval from a second end part to a negative electrode tab join part in the above described surface direction is treated as D2.

11 Claims, 11 Drawing Sheets

(56) References Cited

U.S. PATENT DOCUMENTS

| | | | |
|---|---|---|---|
| 2016/0336576 | A1 | 11/2016 | Shinoda et al. |
| 2017/0125783 | A1 | 5/2017 | Mune et al. |
| 2019/0296283 | A1* | 9/2019 | Chen .................. H01M 50/503 |
| 2019/0379027 | A1 | 12/2019 | Fukunaga et al. |
| 2021/0265708 | A1 | 8/2021 | Lim et al. |

FOREIGN PATENT DOCUMENTS

| | | |
|---|---|---|
| JP | 2015-141847 A | 8/2015 |
| JP | 2015-195157 A | 11/2015 |
| JP | 2017-050069 A | 3/2017 |
| WO | WO 2015/146584 A1 | 10/2015 |
| WO | WO 2018/003843 A1 | 1/2018 |
| WO | WO 2020/017923 A1 | 1/2020 |
| WO | WO 2020/069643 A1 | 4/2020 |
| WO | WO 2021-060010 A1 | 4/2021 |

* cited by examiner

BATTERY

CROSS REFERENCE TO RELATED APPLICATIONS

The present application claims the priority based on Japanese Patent Application No. 2021-136558 filed on Aug. 24, 2021, the entire contents of which are incorporated in the present specification by reference.

BACKGROUND

The present disclosure relates to a battery.

BACKGROUND ART

A battery, such as a lithium ion secondary battery, generally includes an electrode body including an electrode, an outer package including an opening part and accommodating the electrode body, a sealing plate sealing the opening part of the outer package, and a terminal being electrically connected to the electrode at the inside of the outer package and extending from the sealing plate to the outside of the outer package. Regarding this type of the battery, a configuration is known in which an electrode tab group including a plurality of tabs for electrical collector is provided on the electrode and in which the electrode tab group is connected to the terminal through the electrode electrical collector part. For example, International Patent Publication 2021/060010 discloses a battery in which a positive electrode tab group is provided at one end part of the electrode body in the longitudinal direction and a negative electrode tab group is provided at the other end part of the electrode body. Then, the positive electrode tab group in a state of being folded and bent is connected to the positive electrode electrical collector part and the negative electrode tab group in a state of being folded and bent is connected to the negative electrode electrical collector part.

SUMMARY

Anyway, regarding the positive electrode tab and the negative electrode tab in the battery as described above, tabs having different bending rigidities might be used often. For example, as the positive electrode tab, a tab configured with aluminum, aluminum alloy, or the like might be used and, as the negative electrode tab, a tab configured with copper, copper alloy, or the like might be used. Then, according to the examination of the inventor, it was found that a folded and bent portion (which might be, hereinafter, referred to as "bent portion", too) of the tab having the higher bending rigidity is easily damaged in the case where, by the external force (for example, external force applied in the longitudinal direction of the electrode body), the electrode body is deviated from a predetermined arrangement position. There is a fear of making the electrical connection of the electrode and the terminal be unstable or become connection failure by doing this, which is not preferable.

The present disclosure has been made in view of the above described circumstances, and the main object is to provide a battery in which the damage on the electrode tab group (especially, positive electrode tab group) is suitably inhibited.

The present disclosure provides a battery that includes one or a plurality of electrode bodies each provided with a positive electrode and a negative electrode, and includes a battery case accommodating the above described electrode body. The above described battery case includes an outer package that includes a bottom wall, a pair of first side walls extending from the above described bottom wall and being mutually opposed, a pair of second side walls extending from the above described bottom wall and being mutually opposed, and an opening part being opposed to the above described bottom wall, the above described battery case includes a sealing plate that seals the above described opening part, and a positive electrode terminal and a negative electrode terminal are attached to the above described sealing plate. The above described electrode body includes a first end part existing in a surface direction along the above described first side wall and a positive electrode tab group that is configured with a plurality of positive electrode tabs protruding from the above described first end part, each tab being configured with aluminum or aluminum alloy, and includes a second end part existing in a surface direction along the above described first side wall and being different from the above described first end part and a negative electrode tab group that is configured with a plurality of negative electrode tabs protruding from the above described second end part, each tab being configured with copper or copper alloy. A thickness of each of the above described positive electrode tabs configuring the above described positive electrode tab group is larger than a thickness of each of the above described negative electrode tabs configuring the above described negative electrode tab group. The above described positive electrode tab group and the above described positive electrode terminal are electrically connected via a positive electrode electrical collector part, the above described positive electrode electrical collector part includes a positive electrode tab join part in which a tip end portion of the above described positive electrode tab group is joined in a state of being bent so as to be arranged along the above described second side wall, the above described negative electrode tab group and the above described negative electrode terminal are electrically connected via a negative electrode electrical collector part, and the above described negative electrode electrical collector part includes a negative electrode tab join part in which a tip end portion of the above described negative electrode tab group is joined in a state of being bent so as to be arranged along the above described second side wall. In a case where a length of an interval from the above described first end part to the above described positive electrode tab join part in the above described surface direction is treated as D1 and a length of an interval from the above described second end part to the above described negative electrode tab join part in the above described surface direction is treated as D2, D1>D2 is satisfied. Although details are described later, by satisfying D1>D2 as described above, it is possible to suitably inhibit the damage on the electrode tab group (particularly, positive electrode tab group) even in the case where, for example, the external force applied in the longitudinal direction of the electrode body makes the electrode body be deviated from a predetermined arrangement position.

In one suitable aspect of the herein disclosed battery, the above described positive electrode tab group is joined to a surface of the above described positive electrode electrical collector part at a side of the above described electrode body, and the above described negative electrode tab group is joined to a surface of the above described negative electrode electrical collector part at a side of the above described electrode body. In accordance with such a configuration, it is possible to suitably suppress the edge of the electrode electrical collector part from coming into contact with the electrode tab group, and thus it is possible to suitably inhibit the damage on the electrode tab group.

In one aspect of the herein disclosed battery, a number of the above described positive electrode tabs configuring the above described positive electrode tab group is smaller than a number of the above described negative electrode tabs configuring the above described negative electrode tab group.

in one aspect of the herein disclosed battery, the above described positive electrode includes a positive electrode electrical collector body that is long, and includes the above described positive electrode tabs formed at a plurality of positions along the above described longitudinal direction of the above described positive electrode electrical collector body, a positive electrode active material layer is formed on the above described positive electrode electrical collector body, and a positive electrode protective layer is formed on a portion along an end part of the above described positive electrode active material layer and on the above described positive electrode tabs. In addition, the above described negative electrode includes a negative electrode electrical collector body that is long, and includes the above described negative electrode tabs formed at a plurality of positions along the above described longitudinal direction of the above described negative electrode electrical collector body, and a negative electrode active material layer is formed on the above described negative electrode electrical collector body and on the above described negative electrode tabs.

In one aspect of the battery as described above, a length of a formed portion of the above described positive electrode protective layer in a protruding direction of the above described positive electrode tabs is shorter than a length of a formed portion of the above described negative electrode active material layer in a protruding direction of the above described negative electrode tabs.

In one suitable aspect of the herein disclosed battery, the above described electrode body includes a pair of flat outside surfaces, and a fixing member is at least arranged from one flat outside surface among the above described flat outside surfaces to the above described positive electrode electrical collector pan or the above described negative electrode electrical collector part. In accordance with such a configuration, it is possible, for example, to suitably inhibit the external force applied in the longitudinal direction of the electrode body from deviating the electrode body from a predetermined arranged position. By doing this, it is possible to suitably inhibit the damage on the electrode tab group, and thus it is preferable.

One suitable aspect of the herein disclosed battery further includes an insulating member that insulates the above described sealing plate and the above described positive electrode electrical collector part or the above described negative electrode electrical collector part, and the above described insulating member includes a base part that is arranged between the above described sealing plate and the above described positive electrode electrical collector part or the above described negative electrode electrical collector part, and includes one or a plurality of protruding parts that are provided at a center side of the above described electrode body in the above described surface direction more than the above described base pan, and that protrude from a side of the above described sealing plate and to a side of the above described electrode body. In accordance with such a configuration, it is possible, for example, to suitably inhibit the external force applied in a direction perpendicular to the longitudinal direction of the electrode body from deviating the electrode body from a predetermined arranged position.

By doing this, it is possible to suitably inhibit the damage on the electrode tab group, and thus it is preferable.

DETAILED DESCRIPTION

Below, while referring to drawings, several preferred embodiments of the herein disclosed technique will be explained. Incidentally, the matters other than matters particularly mentioned in this specification, and required for practicing the present disclosure (for example, a general configuration and a general manufacture process of the battery that do not characterize the present disclosure) can be grasped as design matters of those skilled in the art based on the related art in the present field. The present disclosure can be executed based on the contents disclosed in the present specification, and the technical common sense in the present field. The below described explanation is not intended to restrict the herein disclosed technique to the below described embodiment. Additionally, in the present specification, the wording "A to B" representing a numerical value range semantically covers not less than A and not more than B, and further semantically covers meaning "more than A" and "less than B".

Incidentally, in the present specification, the "battery" is a term widely denoting an electric storage device capable of taking out the electric energy, and is a concept containing the primary battery and the secondary battery. Additionally, in the present specification, the "secondary battery" is a term widely denoting an electric storage device capable of repeatedly charging and discharging, and is a concept containing so called storage batteries (chemical batteries), such as a lithium ion secondary battery and a nickel hydrogen battery, and containing capacitors (physical batteries), such as an electric double layer capacitor. Incidentally, in the present specification, the "bending rigidity" is a concept determined on the basis of the modulus of longitudinal elasticity (Young's modulus) and the cross section shape.

<Battery 100>

Figure 1:
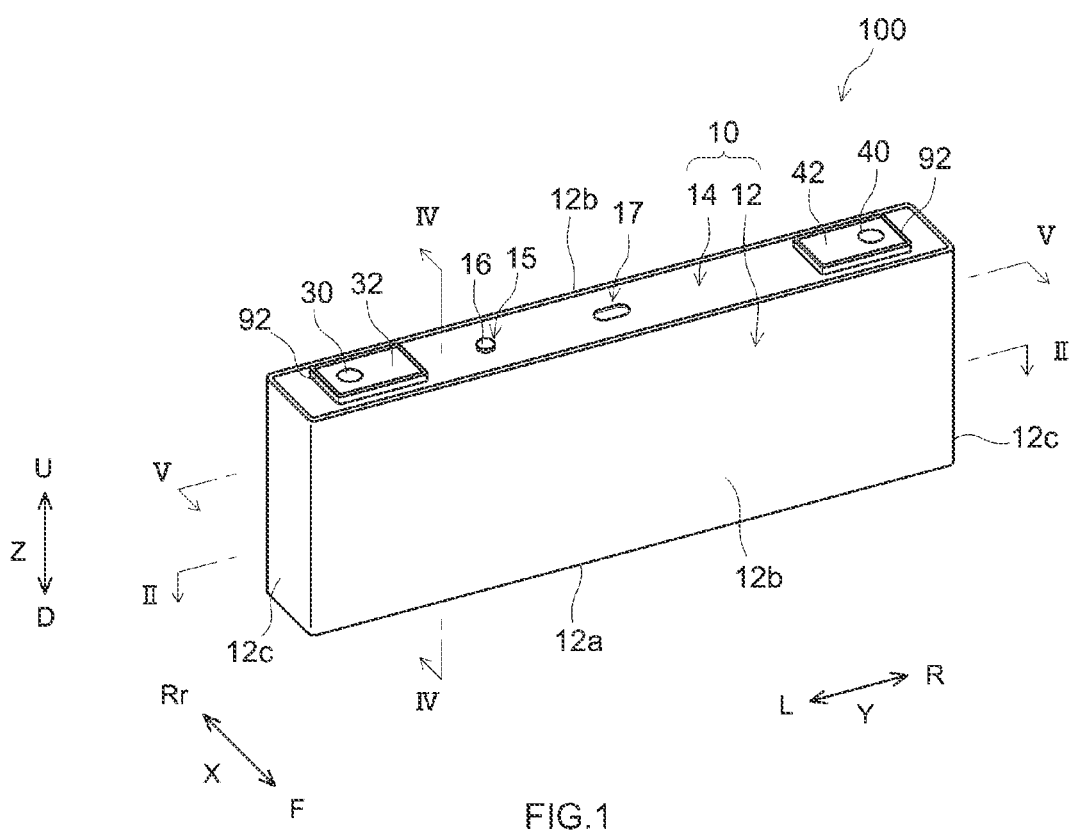
FIG. 1 is a perspective view that schematically shows a battery in accordance with one embodiment.
Figure 2:
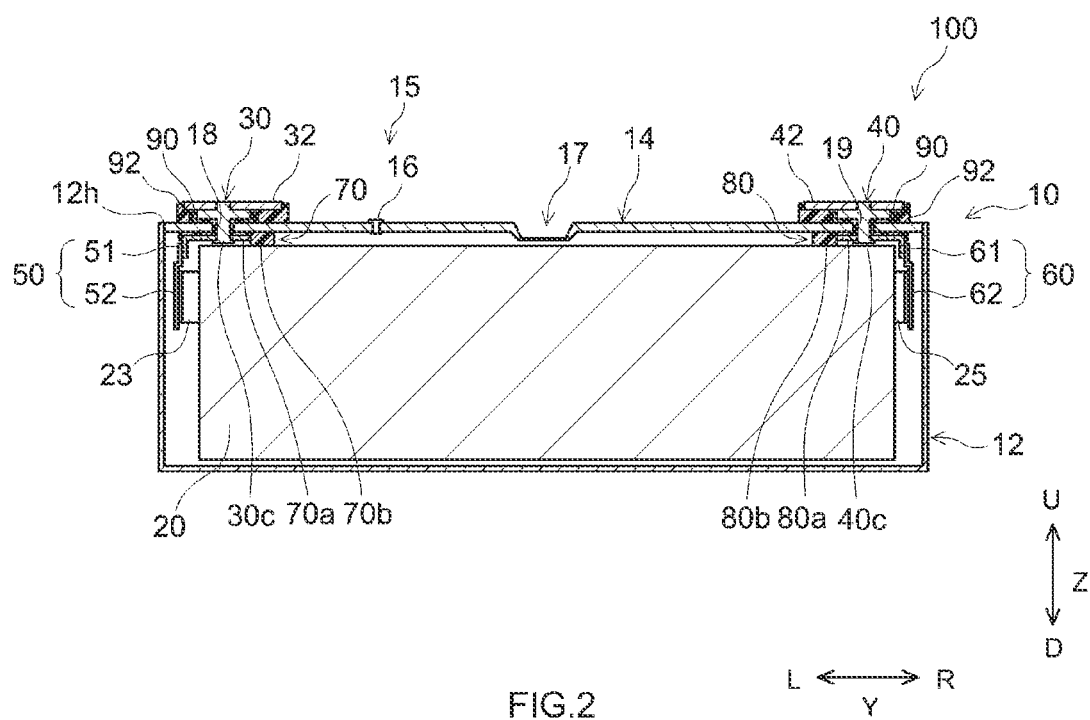
FIG. 2 is a longitudinal cross section view that is schematically shown along the II-II line of FIG. 1.
Figure 4:
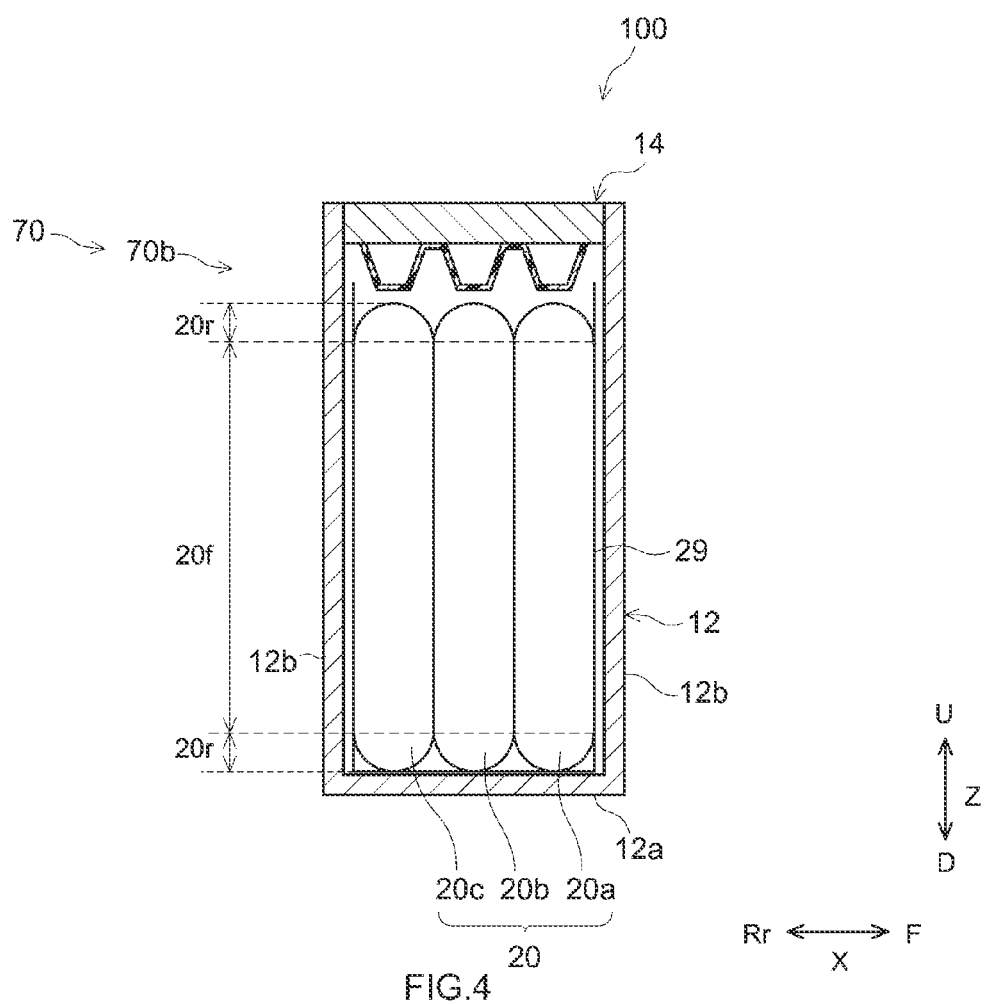
FIG. 4 is a longitudinal cross section view that is schematically shown along the IV-IV line of FIG. 1.
Figure 5:
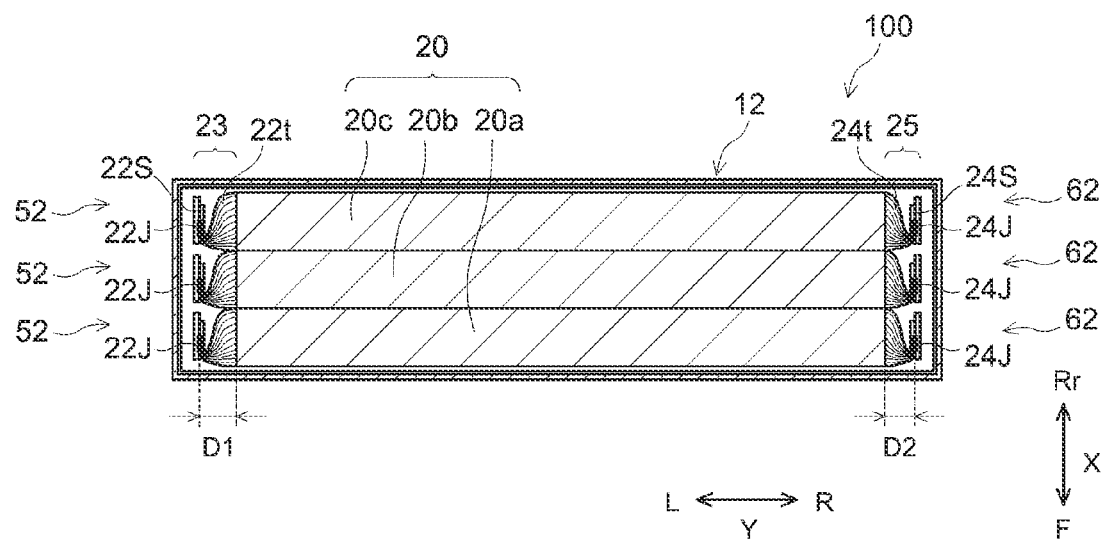
FIG. 5 is a lateral cross section view that is schematically shown along the V-V line of FIG. 1.

FIG. 1 is a perspective view of a battery 100. FIG. 2 is a longitudinal cross section view that is schematically shown along the II-II line of FIG. 1. FIG. 4 is a longitudinal cross section view that is schematically shown along the IV-IV line of FIG. 1. FIG. 5 is a lateral cross section view that is schematically shown along the V-V line of FIG. 1. Incidentally, in the below described explanation, the reference signs L, R, F, Rr, U, and D in drawings respectively represent left, right, front, rear, up, and down, and the reference signs X, Y, and Z in drawings respectively represent the short side direction, the long side direction orthogonal to the short side direction (which might be referred to as the longitudinal direction of the electrode body, too), and the vertical direction of the battery 100. However, these are directions for convenience sake of explanation, and do not restrict the disposed form of the battery 100.

As shown in FIG. 2, the battery 100 includes a battery case 10, an electrode body group 20, a positive electrode terminal 30, a negative electrode terminal 40, a positive electrode electrical collector part 50, a negative electrode electrical collector part 60, a positive electrode insulating member 70, and a negative electrode insulating member 80. In addition, the electrode body group 20 is configured with electrode bodies 20a, 20b, 20c, each of which includes a positive electrode tab group 23 and a negative electrode tab group 25. In the battery 100 according to the present embodiment, a positive electrode tab 22t (see FIG. 5) configuring the positive electrode tab group 23 is configured with aluminum, and a negative electrode tab 24t (see FIG. 5) configuring the negative electrode tab group 25 is configured with copper, and the thickness of the positive electrode tab group 23 is larger than the thickness of the negative electrode tab group 25. The bending rigidity of the positive electrode tab group 23 is configured to be higher, in comparison with the rigidity of the negative electrode tab group 25. In addition, as the illustration is omitted, the battery 100 here includes an electrolyte, too. The battery 100 here is a lithium ion secondary battery.

Figure 3:
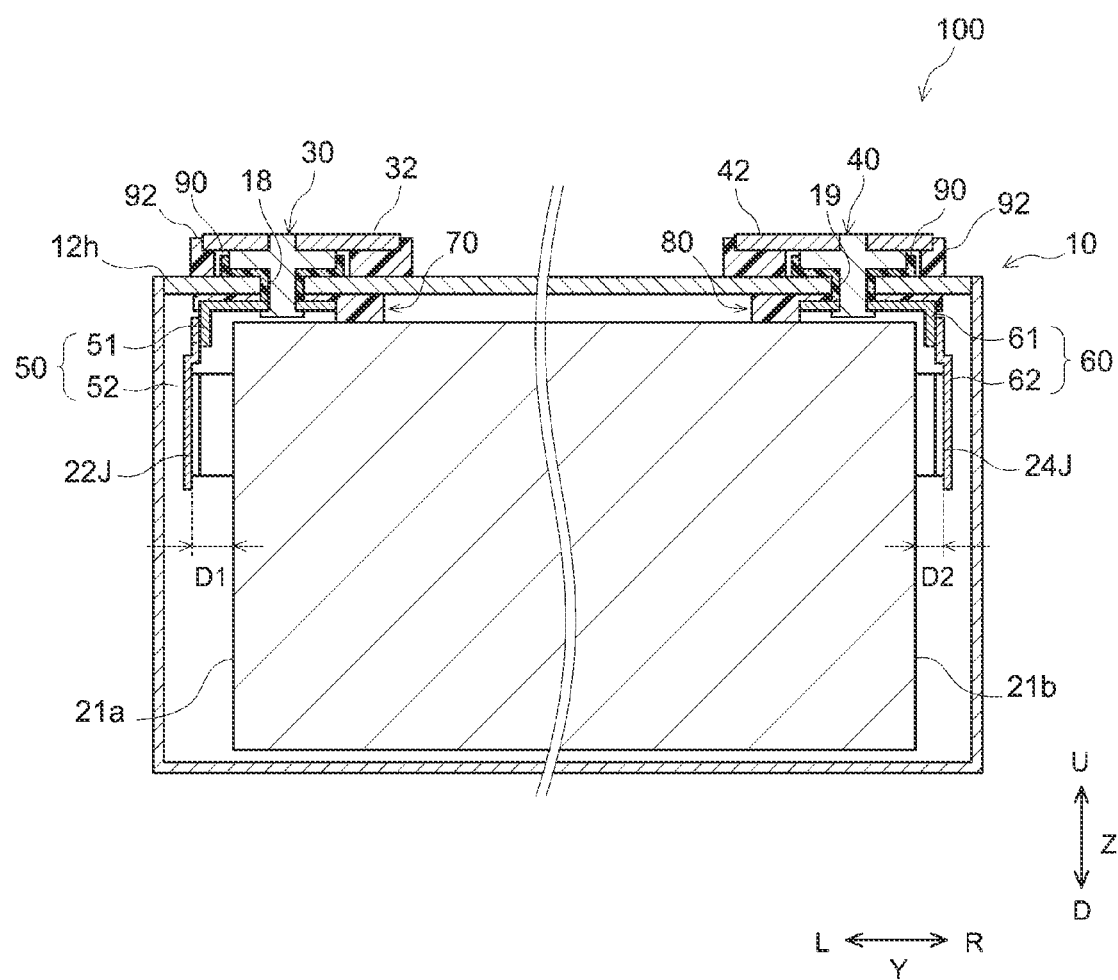
FIG. 3 is a partially enlarged view of the vicinity of a positive electrode tab group and the vicinity of a negative electrode tab group of FIG. 2.

As shown in FIG. 3, the battery 100 in accordance with the present embodiment satisfies D1>D2 in the case where a length of the interval (shortest distance) from a first end part 21a existing in a surface direction (in other words, long side direction Y of FIG. 3) along the first side wall 12b to a positive electrode tab join part 22J of a positive electrode second collector part 52 is treated as D1 and a length of the interval (shortest distance) from a second end part 21b in the above described surface direction to a negative electrode tab join part 24J of a negative electrode second collector part 62 is treated as D2. By setting to satisfy D1>D2 as described above, it is possible to suitably reduce the load applied on the positive electrode tab group 23, compared with a battery being set to satisfy D1=D2 or D1<D2. By doing this, it is possible to suitably inhibit the damage on the electrode tab group (especially, positive electrode tab group 23), and therefore preferable.

Here, the ratio of D1 to D2 (D1/D2) is not particularly restricted if the effect of the technique herein disclosed is implemented, but can be equal to or more than approximately 1.1, and the ratio can be, from the perspective of suitably reducing the load applied on the positive electrode tab group 23, preferably equal to or more than 1.2, further preferably equal to or more than 1.5, and furthermore preferably equal to or more than 2. In addition, the upper limit of the above described ratio (D1/D2) is not particularly restricted if the effect of the technique herein disclosed is implemented, but is approximately equal to or less than 10, and the upper limit can be, from the perspective of making the size of the load applied to the negative electrode tab group be proper, preferably equal to or less than 5, and further preferably equal to or less than 4 (for example, equal to or less than 3). In addition, the sizes of D1 and D2 are not particularly restricted if the effect of the technique herein disclosed is implemented. For example, the size of D2 can be equal to or more than approximately 0.5 mm, and for example, can be equal to or more than 1 mm. The upper limit of the size of D2 is not particularly restricted if the effect of the technique herein disclosed is implemented, but the upper limit can be equal to or less than approximately 5 mm, for example, equal to or less than 4 mm, equal to or less than 3 mm, or equal to or less than 2 mm. In other words, the size of D2 can be set to be 1 mm to 2 mm. Incidentally, the size of D1 can be suitably decided by referring to, for example, the size of D2, the above described ratio (D1/D2), or the like.

Figure 6:
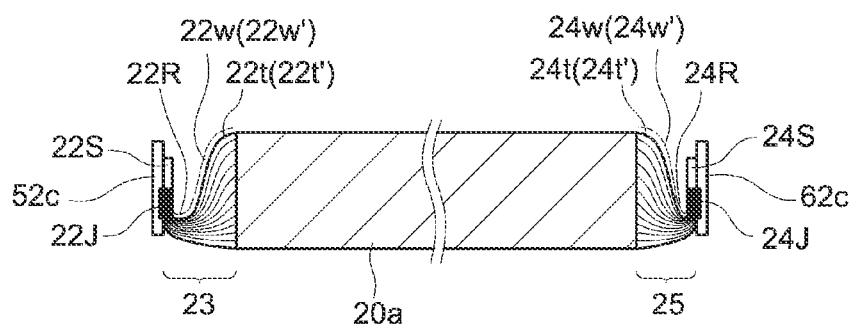
FIG. 6 is a partially enlarged view of the vicinity of the positive electrode tab group and the vicinity of the negative electrode tab group of FIG. 5.

FIG. 6 is a partially enlarged view of the vicinity of the positive electrode tab group and the vicinity of the negative electrode tab group of FIG. 5. In FIG. 6, a bent portion of the positive electrode tab 22t configuring the positive electrode tab group 23 is represented by 22W and a bent portion of the negative electrode tab 24t configuring the negative electrode tab group 25 is represented by 24W. Here, the bent portion 22W can be referred to as a portion from the first end part 21a of the positive electrode tab 22t to the positive electrode tab join part 22J, and the bent portion 24W can be referred to as a portion from the second end part 21b of the negative electrode tab 24t to the negative electrode tab join part 24J. In addition, a bent portion of the positive electrode tab 22t' existing at the innermost position among the positive electrode tabs 22t configuring the positive electrode tab group 23 is represented by 22W', and a bent portion of the negative electrode tab 24t' existing at the innermost position among the negative electrode tabs 24t configuring the negative electrode tab group 25 is represented by 24W'. Then, an R part of the bent portion 22W' is represented by 22R, and an R part of the bent portion 24W' is represented by 24R.

Here, in the case where the minimum bending radius of the R part 22R is represented by 22r (not shown) and the minimum bending radius of the R part 24R is represented by 24r (not shown), the ratio of the minimum bending radius 22r to the minimum bending radius 24r (22r/24r) can be set to be equal to or more than approximately 1.1, which is not particularly restricted if the effect of the technique herein disclosed is implemented. In addition, while D1>D2 is satisfied, it is possible, further from the perspective of suitably inhibiting the damage on the positive electrode tab group 23, to make the above described ratio (22r/24r) be preferably equal to or more than 1.5, further preferably equal to or more than 1.8, or furthermore preferably equal to or more than 2. In addition, the upper limit of the above described ratio (22r/24r) is not particularly restricted if the effect of the technique herein disclosed is implemented, but can be set to be approximately equal to or less than 4, and can be set, from the perspective of making the size of the load applied to the negative electrode tab group be more suitable, to be preferably equal to or less than 3, or further preferably equal to or less than 2.5. Incidentally, the minimum bending radiuses 22r, 24r can be measured, for example, by an image measuring device. The above described ratio (22r/24r) can be changed, for example, by adjusting the length of D1 or D2.

Figure 7:
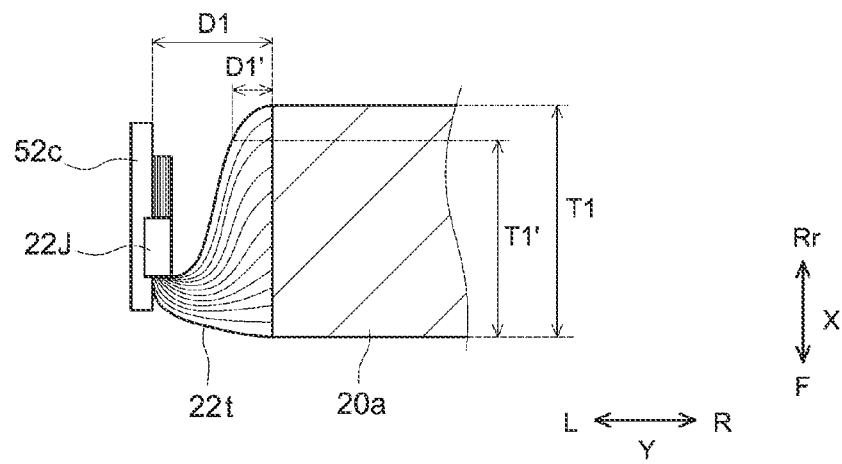
FIG. 7 is a partially enlarged view of the vicinity of the positive electrode tab group of FIG. 5.

FIG. 7 is a partially enlarged view of the vicinity of the positive electrode tab group of FIG. 5. FIG. 7 shows D1' that represents a length corresponding to ⅓ of D1. In addition, T1 represents the thickness of the positive electrode tab group 23, and T1' represents the thickness of the positive electrode tab group 23 at the position of D1'. Here, the thickness of the positive electrode tab group 23 can be treated as (thickness of positive electrode tab 22t)×(number of positive electrode tabs 22t). Additionally, for example, in the case where there is a gap between the positive electrode tabs, the thickness of the positive electrode tab group can be treated as a thickness in which the thickness of the gap as described above is contained. In the case where there is a gap between the positive electrode tabs, the possibility of coming the positive electrode tab into contact with the end part of the negative electrode over the adjacent separator is reduced, and thus it is preferable.

Here, the ratio of T1' to T1 (T1'/T1) is not particularly restricted if the effect of the technique herein disclosed is implemented, but can be set to be approximately equal to or more than 0.5, and the ratio can be set, from the perspective of inhibiting the plastic deformation caused by bending the positive electrode tab 22t, to be preferably equal to or more than 0.6, further preferably equal to or more than 0.7, or furthermore preferably equal to or more than 0.8. In addition, the upper limit of the above described ratio (T1'/T1) is not particularly restricted, but can be set to be approximately equal to or less than 0.9.

The battery case 10 is a housing that accommodates the electrode body group 20, as shown in FIG. 2. The battery case 10 here has an outer shape formed in a flat and bottomed rectangular parallelopiped shape (square shape). It is enough that the material of the battery case 10 is the same as one conventionally used, which is not particularly restricted. It is preferable that the battery case 10 is made of metal, or it is more preferable that, for example, the battery case consists of aluminum, aluminum alloy, iron, iron alloy, or the like. As shown in FIG. 2, the battery case 10 includes an outer package 12 having an opening part 12h, and includes a sealing plate (lid body) 14 covering the opening part 12h.

As shown in FIG. 1, the outer package 12 includes a bottom wall 12a, a pair of longer side walls 12b extending from the bottom wall 12a and being opposed mutually, and a pair of shorter side walls 12c extending from the bottom wall 12a and being opposed mutually. The bottom wall 12a is approximately rectangular. The bottom wall 12a is opposed to the opening part 12h. The area of the shorter side wall 12c is smaller than the area of the longer side wall 12b. The longer side wall 12b and the shorter side wall 12c are respectively examples of the first side wall and the second side wall disclosed herein. The sealing plate 14 is attached to the outer package 12 to cover the opening part 12h of the outer package 12. The sealing plate 14 is opposed to the bottom wall 12a of the outer package 12. The sealing plate 14 is approximately rectangular in a plane view. The battery case 10 is integrated by joining (e.g., welding and joining) the sealing plate 14 to the circumferential edge of the opening part 12h of the outer package 12. The battery case 10 is airtightly sealed (airtightly closed).

As shown in FIG. 2, the sealing plate 14 is provided with a liquid injection hole 15, a gas exhaust valve 17, and two terminal taking out holes 18, 19. The liquid injection hole 15 is for performing liquid injection of the electrolyte after the sealing plate 14 is assembled with the outer package 12. The liquid injection hole 15 is sealed by a sealing member 16. The gas exhaust valve 17 is configured to be broken so as to exhaust the gas inside the battery case 10 to the outside when the pressure inside the battery case 10 becomes equal to or more than a predetermined value. The terminal taking out holes 18, 19 are respectively formed at the opposite ends of the sealing plate 14 in the long side direction Y. The terminal taking out holes 18, 19 penetrate the sealing plate 14 in the vertical direction Z. The terminal taking out holes 18, 19 respectively have inner diameters whose sizes are capable of inserting the positive electrode terminal 30 and the negative electrode terminal 40 before attached to the sealing plate 14 (before the caulking process).

The positive electrode terminal 30 and the negative electrode terminal 40 both are fixed to the sealing plate 14. The positive electrode terminal 30 is arranged at one side (left side in FIG. 1 and FIG. 2) of the sealing plate 14 in the long side direction Y. The negative electrode terminal 40 is arranged at the other side (right side in FIG. 1 and FIG. 2) of the sealing plate 14 in the long side direction Y. As shown in FIG. 1, the positive electrode terminal 30 and the negative electrode terminal 40 are exposed on the outside surface of the sealing plate 14. As shown in FIG. 2, the positive electrode terminal 30 and the negative electrode terminal 40 are respectively inserted into the terminal taking out holes 18, 19 so as to extend from the inside to the outside of the sealing plate 14. The positive electrode terminal 30 and the negative electrode terminal 40 here are respectively caulked by the caulking process to the circumferential edge portions surrounding the terminal taking out holes 18, 19 of the sealing plate 14. On the end parts (lower end part in FIG. 2) of the positive electrode terminal 30 and the negative electrode terminal 40 at the outer package 12 side, caulking parts 30c, 40c are formed.

As shown in FIG. 2, the positive electrode terminal 30 is electrically connected inside the outer package 12 to the positive electrode 22 of the electrode body group 20 through the positive electrode electrical collector part 50. The negative electrode terminal 40 is electrically connected inside the outer package 12 to the negative electrode 24 of the electrode body group 20 through the negative electrode electrical collector part 60. The positive electrode terminal 30 is insulated from the sealing plate 14 by a positive electrode insulating member 70 and a gasket 90. The negative electrode terminal 40 is insulated from the sealing plate 14 by a negative electrode insulating member 80 and the gasket 90. The positive electrode terminal 30 and the negative electrode terminal 40 are examples of the herein disclosed terminal.

It is preferable that the positive electrode terminal 30 is made of metal, or it is more preferable that the positive electrode terminal consists of, for example, aluminum or aluminum alloy. It is preferable that the negative electrode terminal 40 is made of metal, or it is more preferable that the negative electrode terminal consists of, for example, copper or copper alloy. The negative electrode terminal 40 might be configured with two electrically conductive members joined and integrated. For example, the portion connected to the negative electrode electrical collector part 60 might consist of copper or copper alloy, and the portion exposed on the outside surface of the sealing plate 14 might consist of aluminum or aluminum alloy.

As shown in FIG. 1, a plate-shaped positive electrode outside electrically conductive member 32 and negative electrode outside electrically conductive member 42 are attached to the outside surface of the sealing plate 14. The positive electrode outside electrically conductive member 32 is electrically connected to the positive electrode terminal 30. The negative electrode outside electrically conductive member 42 is electrically connected to the negative electrode terminal 40. The positive electrode outside electrically conductive member 32 and the negative electrode outside electrically conductive member 42 each is a member to which a bus bar is attached when a plurality of batteries 100 are mutually and electrically connected. It is preferable that the positive electrode outside electrically conductive member 32 and the negative electrode outside electrically conductive member 42 each is made of metal, or it is more preferable that each consists of, for example, aluminum or aluminum alloy. The positive electrode outside electrically conductive member 32 and the negative electrode outside electrically conductive member 42 each is insulated from the sealing plate 14 by an outside insulating member 92. However, the positive electrode outside electrically conductive member 32 and the negative electrode outside electrically conductive member 42 are not essential, and thus it is possible to omit them in another embodiment.

Figure 8:
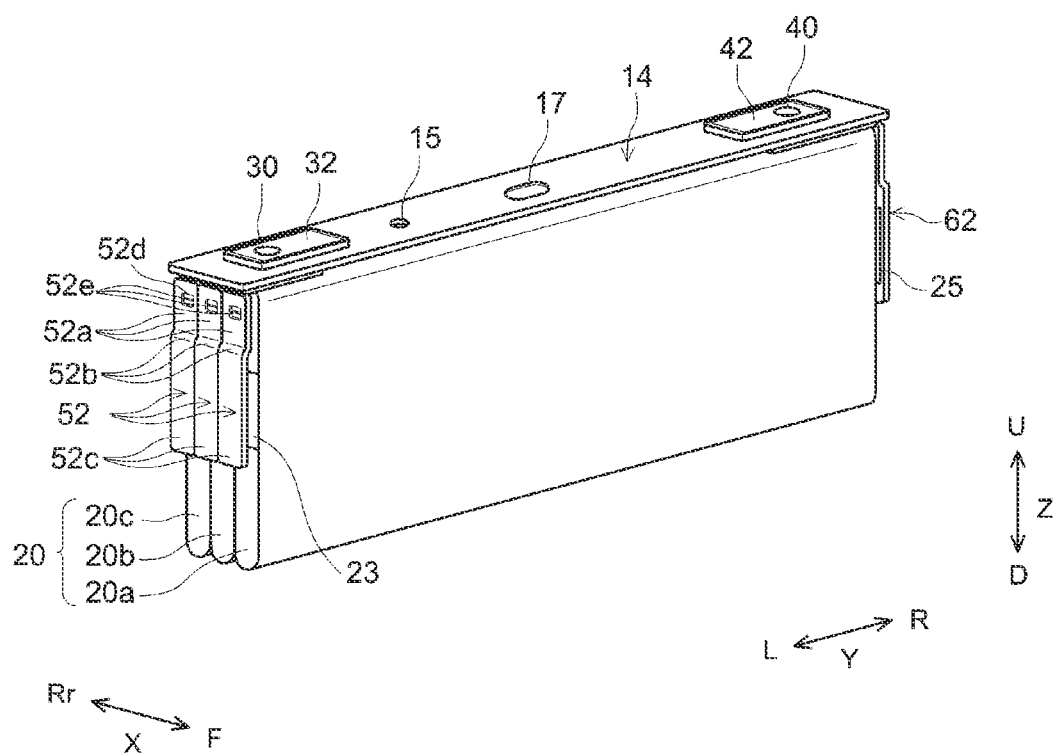
FIG. 8 is a perspective view that schematically shows an electrode body group attached to a sealing plate.

FIG. 8 is a perspective view that schematically shows the electrode body group 20 attached to the sealing plate 14. The electrode body group 20 here includes three electrode bodies 20a, 20b, 20c. However, the number of the electrode bodies arranged inside one outer package 12 is not particularly restricted, and might be equal to or more than 2 (plural) or might be 1. The electrode body group 20 here is arranged inside the outer package 12 in a state of being covered by the electrode body holder 29 consisting of a resin-made sheet (see FIG. 4).

Figure 9:
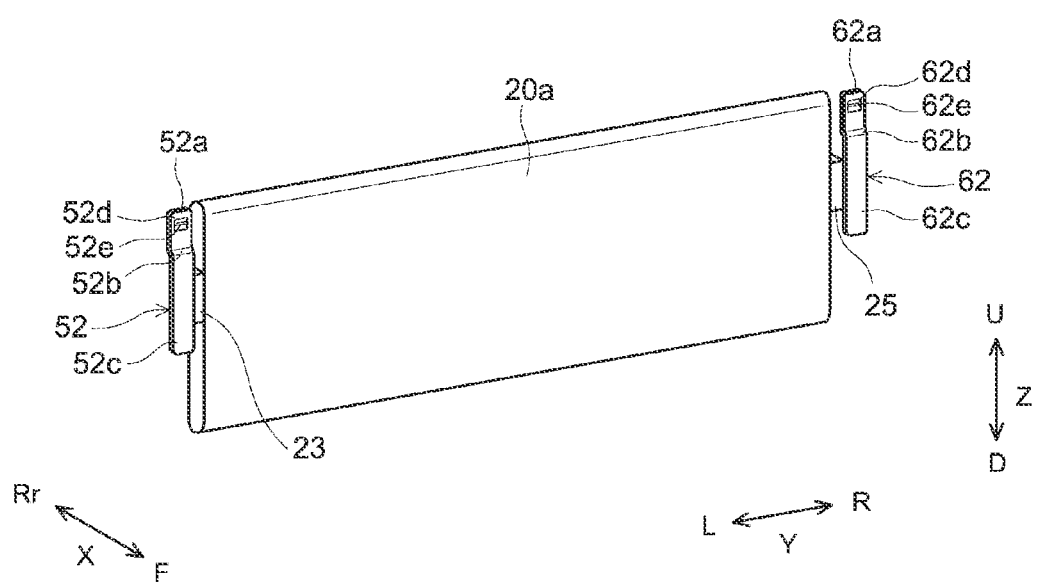
FIG. 9 is a perspective view that schematically shows an electrode body to which the positive electrode second collector part and the negative electrode second collector part are attached.
Figure 10:
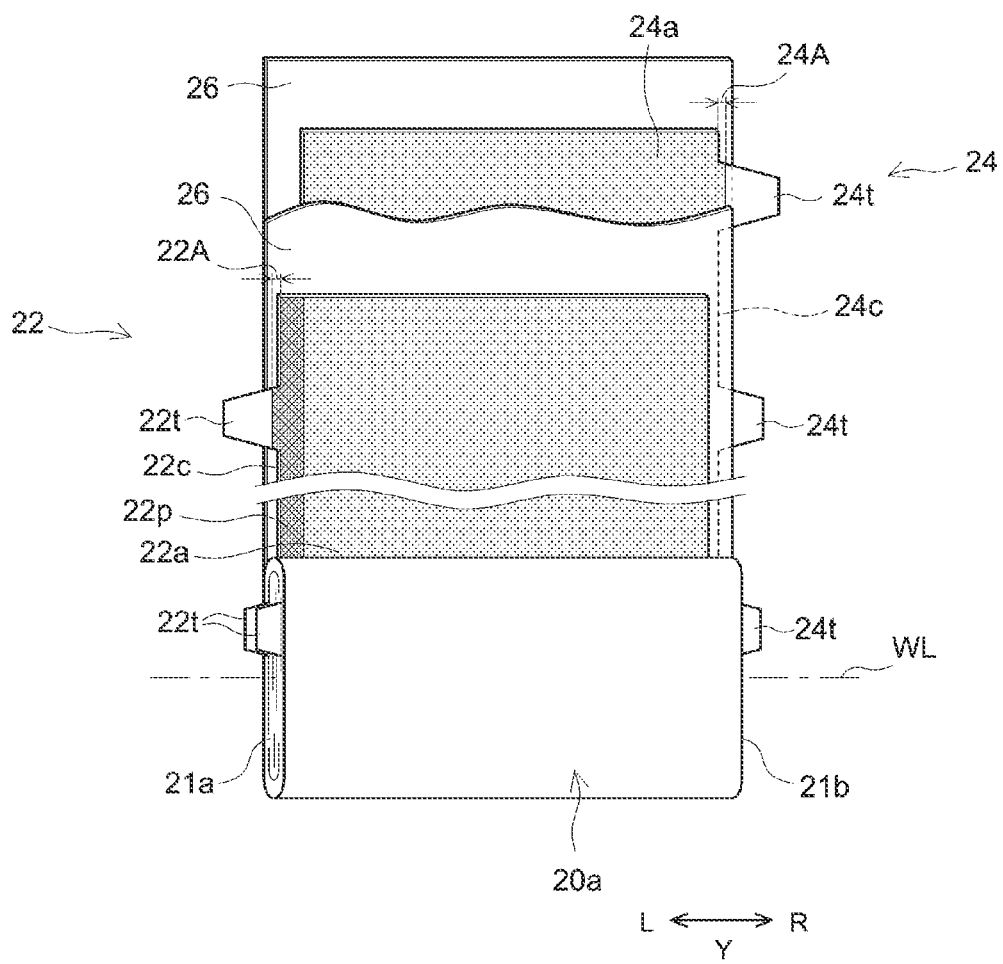
FIG. 10 is a schematic view that shows a configuration of a wound electrode body in accordance with one embodiment.

FIG. 9 is a perspective view that schematically shows the electrode body 20a. FIG. 10 is a schematic view that shows a configuration of the electrode body 20a. Incidentally, though the electrode body 20a will be explained below in detail as an example, the electrode bodies 20b, 20c also can be configured similarly. As shown in FIG. 10, the electrode body 20a includes the positive electrode 22 and the negative electrode 24. The electrode body 20a here is a flat-shaped wound electrode body in which the strip-shaped positive electrode 22 and the strip-shaped negative electrode 24 are laminated through the strip-shaped separator 26 and then wound therein with the winding axis WL being as the center.

The electrode body 20a is arranged inside the outer package 12 with the winding axis WL being parallel to the long side direction Y. In other words, the electrode body 20a is arranged inside the outer package 12 with the winding axis WL being parallel to the bottom wall 12a and being in a direction orthogonal to the shorter side wall 12c. The end surface of the electrode body 20a (in other words, the laminated surface on which the positive electrode 22 and the negative electrode 24 are laminated, and the end surface in the long side direction Y of FIG. 10) is opposed to the shorter side wall 12c.

As shown in FIG. 4, the electrode body 20a includes a pair of bent parts 20r opposed to the bottom wall 12a of the outer package 12 and to the sealing plate 14, and includes a flat part 20f coupled to the pair of bent parts 20r and opposed to the longer side wall 12b of the outer package 12. However, the electrode body 20a might be a laminated electrode body in which a plurality of square-shaped (typical, rectangular) positive electrodes and a plurality of square-shaped (typical, rectangular) negative electrodes are stacked in a state of being insulated.

As shown in FIG. 10, the positive electrode 22 includes a positive electrode electrical collector body 22c, and includes a positive electrode active material layer 22a and a positive electrode protective layer 22p which are fixed on at least one surface of the positive electrode electrical collector body 22c. However, the positive electrode protective layer 22p is not essential, and can be omitted in another embodiment. The positive electrode electrical collector body 22c has a strip-like shape. The positive electrode electrical collector body 22c consists of an electrically conductive metal, for example, aluminum, aluminum alloy, nickel, stainless steel, or the like. The positive electrode electrical collector body 22c here is a metal foil, in particular, aluminum foil.

At one end part (first end part 21a of FIG. 10) of the positive electrode electrical collector body 22c in the long side direction Y, a plurality of positive electrode tabs 22t are provided. The plurality of positive electrode tabs 22t each protrudes toward one side (first end part 21a of FIG. 10) in the long side direction Y. The plurality of positive electrode tabs 22t protrude in the long side direction Y more than the separator 26. The plurality of positive electrode tabs 22t are provided at the intervals (intermittently) along the longitudinal direction of the positive electrode 22. The plurality of positive electrode tabs 22t each is formed in a trapezoidal shape. The positive electrode tab in the herein disclosed technique is configured with aluminum (Al) or aluminum alloy. Incidentally, "aluminum" described in the present specification and recited in claims might include an unavoidable component other than aluminum, or the like. In addition, "aluminum alloy" might be alloy which is configured with aluminum as the main component, or might be alloy, for example, which contains aluminum equal to or more than 70 mass %, equal to or more than 80 mass %, or equal to or more than 90 mass % (e.g., equal to or more than 95 mass %) in the case where the total mass of the aluminum alloy is treated as 100 mass %, but "aluminum alloy" is not restricted to them. The positive electrode tab 22t here is formed as a part of the positive electrode electrical collector body 22c configured with aluminum, but it is allowed that the positive electrode tab is a member different from the positive electrode electrical collector body. The positive electrode tab 22t is a portion (electrical collector body exposed part) of the positive electrode electrical collector body 22c on which neither the positive electrode active material layer 22a nor the positive electrode protective layer 22p are formed. In addition, the positive electrode tab 22t might be provided at the other end part (right end part in FIG. 10) in the long side direction Y.

As shown in FIG. 5, the plurality of positive electrode tabs 22t are laminated at one end part (first end part 21a of FIG. 5) in the long side direction Y so as to configure the positive electrode tab group 23. The plurality of positive electrode tabs 22t are folded and bent to make the edges of the outer sides be aligned, and thus are curved. The positive electrode tab group 23 is electrically connected to the positive electrode terminal 30 via the positive electrode electrical collector part 50. In the present embodiment, the positive electrode tab group 23 is joined to the surface of the positive electrode second collector part 52 at the electrode body 20a side. The herein disclosed technique can be applied even to an aspect in which the positive electrode tab group is connected to the surface of the positive electrode second collector part at the second side wall side, but it is possible in the former aspect to suitably suppress the edge of the positive electrode second collector part 52 from coming into contact with the positive electrode tab group 23, and thus it is possible to suitably inhibit the damage on the electrode tab group. Additionally, as shown in FIG. 5, the positive electrode second collector part 52 includes a positive electrode tab join part 22J in which a tip end portion 22S of the positive electrode tab group 23 is joined in a state of being bent so as to be arranged along the second side wall 12c. The sizes of the plurality of positive electrode tabs 22t (length in the long side direction Y and width orthogonal to the long side direction Y, see FIG. 10) can be suitably adjusted, in consideration of the state of being connected to the positive electrode electrical collector part 50, for example, based on the formed position, or the like. The thickness of the positive electrode tab 22t can be, for example, about 5 µm to 30 µm (preferably, about 10 µm to 20 µm), although not restricted to this. The plurality of positive electrode tabs 22t here mutually have different sizes in order to align the edges at the outer sides when being configured to be bent. The positive electrode tab group 23 is an example of the herein disclosed electrode tab group.

As shown in FIG. 10, the positive electrode active material layer 22a is provided in a strip-like shape along the longitudinal direction of the strip-shaped positive electrode electrical collector body 22c. The positive electrode active material layer 22a contains a positive electrode active substance (for example, lithium transition metal composite oxide, such as lithium-nickel-cobalt-manganese composite oxide) that can reversibly store and emit the charge carrier. In the case where the whole solid content of the positive electrode active material layer 22a is treated as 100 mass %, the positive electrode active substance might occupy approximately 80 mass % or more, typically 90 mass or more, or, for example, 95 mass % or more. The positive electrode active material layer 22a might contain an arbitrary component other than the positive electrode active substance, for example, an electrical conducting material, a binder, various additive components, or the like. As the electrical conducting material, it is possible to use a carbon material, for example, acetylene black (AB), or the like. As the binder, it is possible to use, for example, polyvinylidene fluoride (PVdF), or the like. The thickness of the positive electrode active material layer 22a can be, for example, about 100 µm to 200 µm (preferably, about 120 µm to 150 µm), although not restricted to this.

As shown in FIG. 10, the positive electrode protective layer 22p is provided at a boundary portion between the positive electrode electrical collector body 22c and the positive electrode active material layer 22a in the long side direction Y. The positive electrode protective layer 22p here is provided at one end part (left end part in FIG. 10) of the positive electrode electrical collector body 22c in the long side direction Y. However, the positive electrode protective layers 22p might be provided at opposite ends in the long side direction Y. The positive electrode protective layer 22p is provided in a strip-like shape along the positive electrode active material layer 22a. The positive electrode protective layer 22p contains an inorganic filler (e.g., alumina). In the case where the whole solid content of the positive electrode protective layer 22p is treated as 100 mass %, it is allowed that the inorganic filler occupies approximately 50 mass % or more, typically 70 mass % or more, or, for example, 80 mass % or more. The positive electrode protective layer 22p might contain an arbitrary component other than the inorganic filler, for example, an electrical conducting material, a binder, various additive components, or the like. The electrical conducting material and the binder might be the same as those illustrated to be capable of being contained in the positive electrode active material layer 22a. The thickness of the positive electrode protective layer 22p can be, for example, about 30 µm to 150 µm (preferably, about 50 µm to 100 µm), although not being restricted to this.

As shown in FIG. 10, regarding the battery 100 in accordance with the present embodiment, the positive electrode protective layer 22p is formed not only on the positive electrode electrical collector body 22c but also on the positive electrode tab 22t. Here, the shortest length 22A of the formed portion of the positive electrode protective layer 22p in the protruding direction of the positive electrode tab 22t (in other words, left side in FIG. 10) can be suitably adjusted in consideration of the state of being connected to the positive electrode electrical collector part 50, for example, by the formed position, or the like. The length 22A might be set to be, for example, about 1 mm to 10 mm (preferably, about 2 mm to 5 mm), although not restricted to this. In addition, the ratio of the thickness of the positive electrode protective layer 22p to the thickness of the positive electrode active material layer 22a (thickness of positive electrode protective layer/thickness of positive electrode active material layer) can be approximately set to be about 0.3 to 0.7 (preferably, about 0.4 to 0.6), which is not particularly restricted if the effect of the technique herein disclosed is implemented.

As shown in FIG. 10, the negative electrode 24 includes a negative electrode electrical collector body 24c, and includes a negative electrode active material layer 24a that is fixed on at least one surface of the negative electrode electrical collector body 24c. The negative electrode electrical collector body 24c is formed in a strip-like shape. The negative electrode electrical collector body 24c consists of an electrically conductive metal, such as copper, copper alloy, nickel, and stainless steel. The negative electrode electrical collector body 24c here is a metal foil, in particular, a copper foil.

At one end part (second end part 21b of FIG. 10) of the negative electrode electrical collector body 24c in the long side direction Y, a plurality of negative electrode tabs 24t are provided. The plurality of negative electrode tabs 24t protrude toward one side (second end part 21b of FIG. 10) in the long side direction Y. The plurality of negative electrode tabs 24t protrude in the long side direction Y more than the separator 26. The plurality of negative electrode tabs 24t are provided at the intervals (intermittently) along the longitudinal direction of the negative electrode 24. The plurality of negative electrode tabs 24t each is formed in a trapezoidal shape. The negative electrode tab of the herein disclosed technique is configured with copper (Cu) or copper alloy. Incidentally, "copper" described in the present specification and recited in claims might contain an unavoidable component other than the copper, or the like. In addition, "copper alloy" might be alloy which is configured with copper as the main component, or might be alloy, for example, which contains copper equal to or more than 70 mass %, equal to or more than 80 mass %, or equal to or more than 90 mass % (e.g., equal to or more than 95 mass %) in the case where the total mass of the copper alloy is treated as 100 mass %, but "copper alloy" is not restricted to them. The negative electrode tab 24t here is formed as a part of the negative electrode electrical collector body 24c configured with copper, but it is allowed that the negative electrode tab is a member different from the negative electrode electrical collector body. The negative electrode tab 24t here is a portion (electrical collector body exposed part) of the negative electrode electrical collector body 24c on which the negative electrode active material layer 24a is not formed. In addition, the negative electrode tab 24t might be provided at the other end part (left end part in FIG. 10) in the long side direction Y.

As shown in FIG. 5, the plurality of negative electrode tabs 24t are laminated at one end part (second end part 21b of FIG. 10) in the long side direction Y so as to configure the negative electrode tab group 25. The plurality of negative electrode tabs 24t are folded and bent to make the edges of the outer side be aligned, and thus are curved. The negative electrode tab group 25 is electrically connected to the negative electrode terminal 40 via the negative electrode electrical collector part 60. In the present embodiment, the negative electrode tab group 25 is joined to the surface of the negative electrode second collector part 62 at the electrode body 20a side. The herein disclosed technique can be applied to an aspect in which the negative electrode tab group is connected to the surface of the negative electrode second collector part at the second side wall side, but it is possible in the former aspect to suitably suppress the edge of the negative electrode second collector part 62 from coming into contact with the negative electrode tab group 25, and thus it is possible to suitably inhibit the damage on the electrode tab group. Additionally, as shown in FIG. 5, the negative electrode second collector part 62 includes a negative electrode tab join part 24J in which a tip end portion 24S of the negative electrode tab group 25 is joined in a state of being bent so as to be arranged along the second side wall 12c. It is preferable that the plurality of negative electrode tabs 24t are folded and bent so as to be electrically connected with the negative electrode terminal 40. At the negative electrode tab group 25, a negative electrode second collector part 62 described later is attached. The size of the plurality of negative electrode tabs 24t (length in the long side direction Y and width orthogonal to the long side direction Y, see FIG. 10) can be suitably adjusted, in consideration of the state of being connected to the negative electrode electrical collector part 60, for example, based on the its formed position, or the like. The thickness of the negative electrode tab 24t can be, for example, about 3 µm to 30 µm (preferably, about 5 µm to 15 µm), although not restricted to this. The plurality of negative electrode tabs 24t here mutually have different sizes in order to align the edges at the outer sides when being made to be bent. The negative electrode tab group 25 is an example of the herein disclosed electrode tab group.

The negative electrode active material layer 24a is provided in a strip-like shape along the longitudinal direction of the strip-shaped negative electrode electrical collector body 24c. The negative electrode active material layer 24a contains a negative electrode active substance (for example, carbon material, such as graphite) that can reversibly store and emit the charge carrier. In the case where the whole solid content of the negative electrode active material layer 24a is treated as 100 mass %, the negative electrode active substance might occupy approximately 80 mass % or more, typically 90 mass % or more, or, for example, 95 mass % or more. The negative electrode active material layer 24a might contain an arbitrary component other than the negative electrode active substance, for example, a binder, a dispersing agent, various additive components, or the like. As the binder, it is possible to use rubbers, for example, styrene butadiene rubber (SBR), or the like. As the dispersing agent, it is possible to use celluloses, for example, carboxymethyl cellulose (CMC), or the like. The thickness of the negative electrode active material layer 24a can be, for example, about 100 µm to 200 µm (preferably, about 160 µm to 190 µm), although not restricted to this.

As shown in FIG. 10, regarding the battery 100 in accordance with the present embodiment, the negative electrode active material layer 24a is formed not only on the negative electrode electrical collector body 24c but also on the negative electrode tab 24t. Here, the shortest length 24A of the formed portion of the negative electrode active material layer 24a in the protruding direction of the negative electrode tab 24t (in other words, right side in FIG. 10) can be suitably adjusted in consideration of the state being connected to the negative electrode electrical collector part 60, for example, by the formed position, or the like. The length 24A might be set to be, for example, about 1 mm to 10 mm (preferably, about 2 mm to 5 mm), although not restricted to this.

In addition, the ratio of the above described length 24A to the above described length 22A (24A/22A) can be set to be approximately equal to or more than 0.5, or preferably equal to or more than 1.1 (for example, equal to or more than 1.2), which is not particularly restricted if the effect of the technique herein disclosed is implemented. In addition, the upper limit of the above described ratio (24A/22A) can be set to be approximately equal to or less than 2, for example, equal to or less than 1.8 or equal to or less than 1.5, which is not particularly restricted if the effect of the technique herein disclosed is implemented. Here, in the case where the positive electrode tab group and the negative electrode tab group satisfying D1>D2 are manufactured, it is required that the length protruding from the first end part 21a of each positive electrode tab configuring the positive electrode tab group is made to be longer than the length protruding from the second end part 21b of each negative electrode tab configuring the negative electrode tab group. Then, for example, in the case where 24A>22A is satisfied as described in the present embodiment, it is easy to make the length protruding from the first end part 21a of the positive electrode tab 22t become longer, in comparison with the length protruding from the second end part 21b of the negative electrode tab 24t (see FIG. 10). By doing this, it can be easy to manufacture the battery 100 satisfying D1>D2. Incidentally, in the case where 24A≤22A is selected, the lengths of the plurality of positive electrode tabs 22t in the protruding direction would be set to be longer than the lengths of the plurality of negative electrode tabs 24t in the protruding direction.

Additionally, the battery 100 in accordance with the present embodiment is configured to include the positive electrode tabs 22t' configuring the positive electrode tab group 23 whose number is the same as the number of the negative electrode tabs 24t' configuring the negative electrode tab 25, which does not restrict the present disclosure. The ratio of the number of the positive electrode tabs configuring the positive electrode tab group to the number of the negative electrode tabs configuring the negative electrode tab group (number of positive electrode tabs/number of negative electrode tabs) can be approximately equal to or more than 0.5, which is not particularly restricted if the effect of the technique herein disclosed is implemented. In addition, it is possible from the perspective of suitably reducing the load applied to the positive electrode tab that the above described ratio (number of positive electrode tabs/number of negative electrode tabs) is set to be preferably equal to or more than 0.9, or further preferably equal to or more than 0.95. The upper limit of the above described ratio (number of positive electrode tabs/number of negative electrode tabs) can be set to be approximately equal to or less than 2.0, and can be set, from the perspective of suitably keeping the strength of the electrode tab group, to be preferably equal to or less than 1.1, or further preferably equal to or less than 1, which is not particularly restricted if the effect of the technique herein disclosed is implemented. Incidentally, when the above described ratio (number of positive electrode tabs/number of negative electrode tabs) is smaller than 1 (in other words, when the number of the positive electrode tabs configuring the positive electrode tab group is smaller than the number of the negative electrode tabs configuring the negative electrode tab group), it is possible to reduce the capacity deterioration depending on the discharge and charge of the battery.

In the battery 100 according to the present embodiment, the ratio of the thickness of the positive electrode tab $22t'$ configuring the positive electrode tab group 23 to the thickness of the negative electrode tab $24t'$ configuring the negative electrode tab group 25 (thickness of positive electrode tab/thickness of negative electrode tab) can be approximately equal to or more than 1.1, preferably equal to or more than 1.2, or further preferably equal to or more than 1.5, which is not particularly restricted if the effect of the technique herein disclosed is implemented. The upper limit of the above described ratio (thickness of positive electrode tab/thickness of negative electrode tab) can be set to be approximately equal to or less than 5, which is not particularly restricted if the effect of the technique herein disclosed is implemented. In addition, the above described ratio (thickness of positive electrode tab/thickness of negative electrode tab) can be set to be, from the perspective of suitably securing the strength of the electrode tab group, preferably equal to or less than 3, or further preferably equal to or less than 2.5.

The separator 26 is a member that insulates the positive electrode active material layer 22a of the positive electrode 22 and the negative electrode active material layer 24a of the negative electrode 24. As the separator 26, it is suitable to use a porous resin sheet consisting of polyolefin resin, for example, polyethylene (PE), polypropylene (PP), or the like. Incidentally, the surface of the separator 26 is provided with a heat resistance layer (HRL) containing an inorganic filler. As the inorganic filler, it is possible to use, for example, alumina, boehmite, aluminum hydroxide, titania, or the like.

The electrolyte might be similar to the conventional one, which is not particularly restricted. The electrolyte is, for example, a nonaqueous electrolyte containing nonaqueous solvent and supporting salt. The nonaqueous solvent contains, for example, carbonates, such as ethylene carbonate, dimethyl carbonate, ethyl methyl carbonate, or the like. The supporting salt is, for example, a fluorine-containing lithium salt, such as $LiPF_6$. However, the electrolyte might be in a solid state (solid electrolyte) and thus might be integrated with the electrode body group 20.

The positive electrode electrical collector part 50 configures a conduction path that electrically connects the positive electrode tab group 23, configured with the plurality of positive electrode tabs 22t, and the positive electrode terminal 30. As shown in FIG. 2, the positive electrode electrical collector part 50 includes a positive electrode first electrical collector part 51 and a positive electrode second collector part 52. The positive electrode first electrical collector part 51 and the positive electrode second collector part 52 might be made of the metal species the same as the positive electrode electrical collector body 22c, for example, made of an electrically conductive metal, such as aluminum, aluminum alloy, nickel, stainless steel, or the like.

Figure 11:
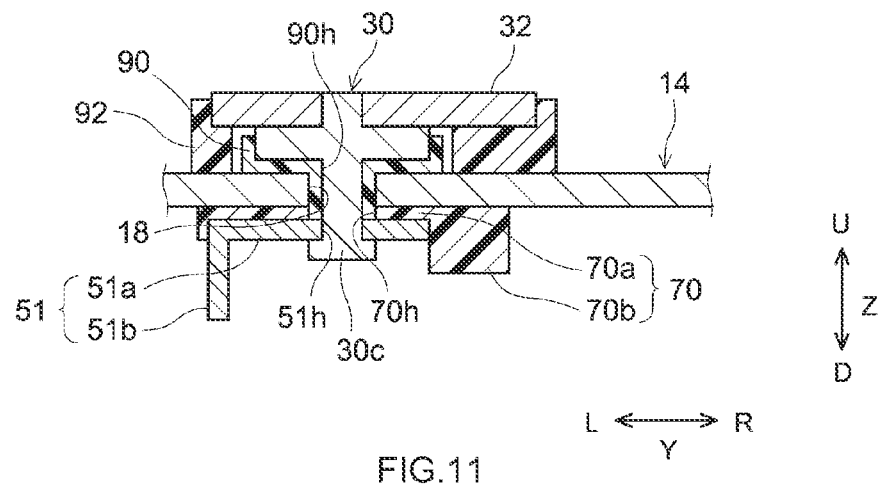
FIG. 11 is a partially enlarged cross section view that schematically shows the vicinity of a positive electrode terminal of FIG. 2.
Figure 12:
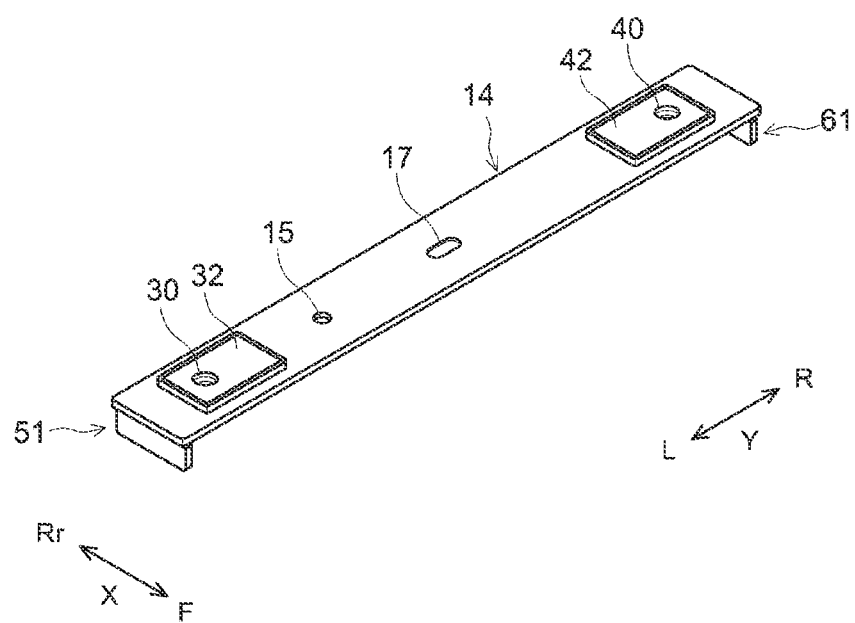
FIG. 12 is a perspective view that schematically shows the sealing plate to which the positive electrode terminal, a negative electrode terminal, a positive electrode first electrical collector part, a negative electrode first electrical collector part, a positive electrode insulating member, and a negative electrode insulating member are attached.
Figure 13:
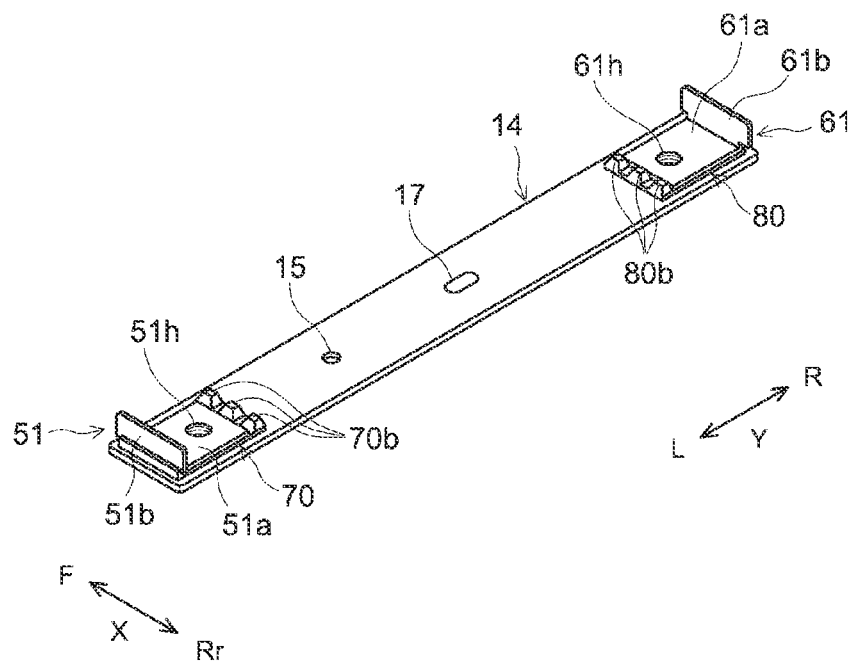
FIG. 13 is a perspective view in which the sealing plate of FIG. 12 is reversed.

FIG. 11 is a partially enlarged cross section view that schematically shows a vicinity of the positive electrode terminal 30 of FIG. 2. FIG. 12 is a perspective view that schematically shows the sealing plate 14. FIG. 13 is a perspective view in which the sealing plate of FIG. 12 is reversed. FIG. 13 shows a surface of the sealing plate 14 at the outer package 12 side (inside). As shown in FIG. 11 to FIG. 13, the positive electrode first electrical collector part 51 is attached to the inside surface of the sealing plate 14. The positive electrode first electrical collector part 51 is an example of the herein disclosed electrical collector part. The positive electrode first electrical collector part 51 includes a first area 51a and a second area 51b. The positive electrode first electrical collector part 51 might be configured by making one member be folded and bent with a pressing process or the like, or might be configured by making a plurality of members be integrated with a welding and joining process or the like. The positive electrode first electrical collector part 51 here is fixed to the sealing plate 14 by the caulking process.

The first area 51a is a portion arranged between the sealing plate 14 and the electrode body group 20. The first area 51a extends along the long side direction Y. The first area 51a expands horizontally along the inside surface of the sealing plate 14. Between the sealing plate 14 and the first area 51a, the positive electrode insulating member 70 is arranged. The first area 51a is insulated by the positive electrode insulating member 70 from the sealing plate 14. The first area 51a here is electrically connected to the positive electrode terminal 30 by the caulking process. In the first area 51a, at the position corresponding to the terminal taking out hole 18 of the sealing plate 14, a penetration hole 51h penetrating in the vertical direction Z is formed. The second area 51b is a portion arranged between the shorter side wall 12c of the outer package 12 and the electrode body group 20. The second area 51b extends from an edge of the first area 51a at one side in the long side direction Y (left edge in FIG. 11) to the shorter side wall 12c of the outer package 12. The second area 51b extends along the vertical direction Z.

The positive electrode second collector part 52 extends along the shorter side wall 12c of the outer package 12. As shown in FIG. 9, the positive electrode second collector part 52 includes an electrical collector plate connecting part 52a, an inclined part 52b, and a tab join part 52c. The electrical collector plate connecting part 52a is a portion electrically connected to the positive electrode first electrical collector part 51. The electrical collector plate connecting part 52a extends along the vertical direction Z. The electrical collector plate connecting part 52a is arranged almost vertically with respect to the winding axes WL of the electrode bodies 20a, 20b, 20c. The electrical collector plate connecting part 52a is provided with a recessed part 52d whose thickness is smaller than the periphery. The recessed part 52d is provided with a penetration hole 52e penetrating in the short side direction X. In the penetration hole 52e, a join part being joined with the positive electrode first electrical collector part 51 is formed. The join part is, for example, a welded and joined part that is formed by welding, such as ultrasonic welding, resistance welding, laser welding, or the like. The positive electrode second collector part 52 might be provided with a fuse.

The tab join part 52c is a portion that is attached to the positive electrode tab group 23 and that is electrically connected to the plurality of positive electrode tabs 22t. As shown in FIG. 8, the tab join part 52c extends along the vertical direction Z. The tab join part 52c is arranged almost vertically with respect to the winding axes WL of the electrode bodies 20a, 20b, 20c. The surface of the tab join part 52c connected to the plurality of positive electrode tabs 22t is arranged in approximately parallel to the shorter side wall 12c of the outer package 12. As shown in FIG. 5, on the tab join part 52c, a positive electrode tab join part 22J being joined to the positive electrode tab group 23 is formed. The positive electrode tab join part 22J is, for example, a welded and joined part that is formed by welding, such as ultrasonic welding, resistance welding, laser welding, or the like, in a state where the plurality of positive electrode tabs 22t are overlaid. The welded and joined part is arranged with the plurality of positive electrode tabs 22t leaning to one sides of respective electrode bodies 20a, 20b, 20c in the short side direction X. By doing this, it is possible to suitably fold and bend the plurality of positive electrode tabs 22t so as to stably form the positive electrode tab group 23 in a bent shape as shown in FIG. 5.

The inclined part 52b is a portion where the lower end of the electrical collector plate connecting part 52a and the top end of the tab join part 52c are coupled. The inclined part 52b is inclined with respect to the electrical collector plate connecting part 52a and to the tab join part 52c. The inclined part 52b couples the electrical collector plate connecting part 52a and the tab join part 52c to position the electrical collector plate connecting part 52a at the center side in the long side direction Y more than the tab join part 52c. By doing this, it is possible to expand the accommodation space of the electrode body group 20 so as to implement the high energy density of the battery 100. It is preferable that the lower end of the inclined part 52b (in other words, end part of the outer package 12 at the bottom wall 12a side) positions downward more than the lower end of the positive electrode tab group 23. By doing this, it is possible to suitably fold and bend the plurality of positive electrode tabs 22t so as to stably form the positive electrode tab group 23 in a bent shape as shown in FIG. 5.

The negative electrode electrical collector part 60 configures a conduction path that electrically connects the negative electrode tab group 25, consisting of the plurality of negative electrode tabs 24t, and the negative electrode terminal 40. As shown in FIG. 2, the negative electrode electrical collector part 60 includes a negative electrode first electrical collector part 61 and a negative electrode second collector part 62. The negative electrode first electrical collector part 61 is an example of the herein disclosed electrical collector part. The negative electrode first electrical collector part 61 and the negative electrode second collector part 62 might consist of an electrically conductive metal which is a metal species the same as the negative electrode electrical collector body 24c, for example, copper, copper alloy, nickel, stainless steel, or the like. The configurations of the negative electrode first electrical collector part 61 and the negative electrode second collector part 62 might be similar to the positive electrode first electrical collector pan 51 and the positive electrode second collector part 52 of the positive electrode electrical collector part 50.

As shown in FIG. 13, the negative electrode first electrical collector part 61 includes a first area 61a and a second area 61b. Between the sealing plate 14 and the first area 61a, a negative electrode insulating member 80 is arranged. The first area 61a is insulated by the negative electrode insulating member 80 from the sealing plate 14. In the first area 51a, a penetration hole 61h penetrating in the vertical direction Z is formed at the position corresponding to the terminal taking out hole 19 of the sealing plate 14. As shown in FIG. 9, the negative electrode second collector part 62 includes an electrical collector plate connecting part 62a electrically connected to the negative electrode first electrical collector part 61, an inclined part 62b, and a tab join part 62c attached to the negative electrode tab group 25 and electrically connected to the plurality of negative electrode tabs 24t. The electrical collector plate connecting part 62a includes a recessed part 62d coupled with the tab join part 62c. At the recessed part 62d, a penetration hole 62e penetrating the short side direction X is provided.

Next, the positive electrode insulating member 70 will be described. Incidentally, although the positive electrode insulating member 70 is explained below in detail as an example, the negative electrode insulating member 80 can be also configured similarly. The positive electrode insulating member 70 is a member that insulates the sealing plate 14 and the positive electrode first electrical collector part 51. It is preferable that the positive electrode insulating member 70 has a resistant property to the used electrolyte, has an electric insulation property, and consists of an elastically deformable resin material, for example, a polyolefin resin, such as polypropylene (PP), a fluororesin, such as tetrafluoroethylene-perfluoroalkoxyethylene copolymer (PFA), polyphenylene sulfide (PPS), or the like.

As shown in FIG. 13, the positive electrode insulating member 70 includes a base part 70a and a plurality of protruding parts 70b. As shown in FIG. 11, in the long side direction Y, the plurality of protruding parts 70b are provided at the center side (right side in FIG. 13) of the sealing plate 14 more than the base part 70a. The base part 70a and the protruding part 70b here are integrally formed. The positive electrode insulating member 70 is an integrally formed product configured by integrally forming a resin material as described above. By doing this, it is possible to reduce the number of used members and implement the low cost, compared with the case where the base part 70a and the protruding part 70b are configured as different members. In addition, it is possible to more easily prepare the positive electrode insulating member 70. In accordance with such a configuration, for example, it is possible to suitably inhibit the electrode bodies 20a, 20b, 20c from being deviated from predetermined arranged positions in response to the external force applied in directions perpendicular to the longitudinal directions of the electrode bodies. By doing this, it is possible to suitably inhibit the damage on the electrode tab group and thus it is preferable. Incidentally, the number of protruding parts 70b can be suitably changed. The similar configuration can be applied to the base part 80a and the plurality of protruding parts 80b.

<Manufacturing Method of Battery 100>

The manufacturing method of the battery 100 is characterized by using the electrode bodies 20a, 20b, 20c satisfying the D1>D2 as described above. The other manufacture processes might be similar to those of the conventional method. The battery 100 can be manufactured by preparing the battery case 10 (outer package 12 and sealing plate 14) as described above, the electrode body group 20 (electrode bodies 20a, 20b, 20c), the electrolyte, the positive electrode terminal 30, the negative electrode terminal 40, the positive electrode electrical collector part 50 (positive electrode first electrical collector part 51 and positive electrode second collector part 52), the negative electrode electrical collector part 60 (negative electrode first electrical collector part 61 and negative electrode second collector part 62), the positive electrode insulating member 70, and the negative electrode insulating member 80, and then by performing the manufacturing method that includes, for example, a first attaching step, a second attaching step, an insertion step, and a sealing step. In addition, the herein disclosed manufacturing method might include another step at an arbitrary stage.

In the first attaching step, a first combined product as shown in FIG. 12 or FIG. 13 is manufactured. In particular, at first, the sealing plate 14 is attached with the positive electrode terminal 30, the positive electrode first electrical collector part 51, the positive electrode insulating member 70, the negative electrode terminal 40, the negative electrode first electrical collector part 61, and the negative electrode insulating member 80.

The positive electrode terminal 30, the positive electrode first electrical collector part 51, and the positive electrode insulating member 70 are fixed to the sealing plate 14, for example, by the caulking process (riveting). As shown in FIG. 11, the caulking process is performed while the gasket 90 is sandwiched between the outside surface of the sealing plate 14 and the positive electrode terminal 30 and further the positive electrode insulating member 70 is sandwiched between the inside surface of the sealing plate 14 and the positive electrode first electrical collector part 51. Incidentally, the material of the gasket 90 might be similar to the positive electrode insulating member 70. In details, the positive electrode terminal 30 before the caulking process is inserted from a position upward the sealing plate 14 into the penetration hole 90h of the gasket 90, the terminal taking out hole 18 of the sealing plate 14, the penetration hole 70h of the positive electrode insulating member 70, and the penetration hole 51h of the positive electrode first electrical collector part 51 in this order, so as to protrude to a position downward the sealing plate 14. Then, a portion protruding downward more than the sealing plate 14 of the positive electrode terminal 30 is caulked to apply compression force in the vertical direction Z. By doing this, the caulking part 30c is formed at the tip end part (lower end part in FIG. 2) of the positive electrode terminal 30.

By the caulking process as described above, it is possible not only to integrally fix the gasket 90, the sealing plate 14, the positive electrode insulating member 70, and the positive electrode first electrical collector part 51 to the sealing plate 14, but also to seal the terminal taking out hole 18. Incidentally, the caulking part 30c might be welded and joined to the positive electrode first electrical collector part 51. By doing this, it is possible to further enhance the conduction reliability.

Fixing the negative electrode terminal 40, the negative electrode first electrical collector part 61, and the negative electrode insulating member 80 can be performed similarly to the case of the above described positive electrode side. In other words, the negative electrode terminal 40 before the caulking process is inserted from a position upward the sealing plate 14 into the penetration hole of the gasket, the terminal taking out hole 19 of the sealing plate 14, the penetration hole of the negative electrode insulating member 80, and the penetration hole of the negative electrode first electrical collector part 61 in this order, so as to protrude to a position downward the sealing plate 14. Then, a portion protruding downward more than the sealing plate 14 of the negative electrode terminal 40 is caulked to apply the compression force in the vertical direction Z. By doing this, the caulking part 40c is formed at the tip end part (lower end part in FIG. 2) of the negative electrode terminal 40.

Then, the positive electrode outside electrically conductive member 32 and the negative electrode outside electrically conductive member 42 are attached to the outside surface of the sealing plate 14 via the outside insulating member 92. Incidentally, the material of the outside insulating member 92 might be similar to the positive electrode insulating member 70. In addition, the timing for attaching the positive electrode outside electrically conductive member 32 and the negative electrode outside electrically conductive member 42 might be after the insertion step (for example, after the liquid injection hole 15 is sealed).

In the second attaching step, the first combined product manufactured at the first attaching step is used so as to manufacture a second combined product as shown in FIG. 8. In other words, the electrode body group 20 integrated with the sealing plate 14 is manufactured. In particular, at first, as shown in FIG. 10, the electrode body 20a is prepared in which the length of the positive electrode tab 22t protruding from the first end part 21a is made to be longer, compared with the length of the negative electrode tab 24t protruding from the second end part 21b. Then, as shown in FIG. 9, three electrode bodies 20a are prepared, each on which the positive electrode second collector part 52 and the negative electrode second collector part 62 are attached is treated as the electrode body 20a, 20b, 20c, and they are arranged to align in the short side direction X. At that time, each of the electrode bodies 20a, 20b, 20c might be aligned in parallel with the positive electrode second collector part 52 being arranged at one side (left side in FIG. 8) in the long side direction Y and with the negative electrode second collector part 62 being arranged at the other side (right side in FIG. 8) in the long side direction Y.

Next, as shown in FIG. 5, in a state where the plurality of positive electrode tabs 22t are bent, the positive electrode first electrical collector part 51 (for more details, second area 51b) fixed to the sealing plate 14 and the positive electrode second collector part 52 (for more details, electrical collector plate connecting part 52a) of the electrode bodies 20a, 20b, 20c are respectively joined. In addition, while being in a state where the plurality of negative electrode tabs 24t are bent, the negative electrode first electrical collector part 61 fixed to the sealing plate 14 and the negative electrode second collector part 62 of the electrode bodies 20a, 20b, 20c are respectively joined. As the joining method, for example, it is possible to use welding, such as ultrasonic welding, resistance welding, and laser welding. Particularly, it is preferable to use welding with the high energy ray irradiation, such as laser. Bt the welding processing as described above, the join parts are formed respectively on the recessed pan 52d of the positive electrode second collector pan 52 and on the recessed pan 62d of the negative electrode second collector part 62.

Figure 14:
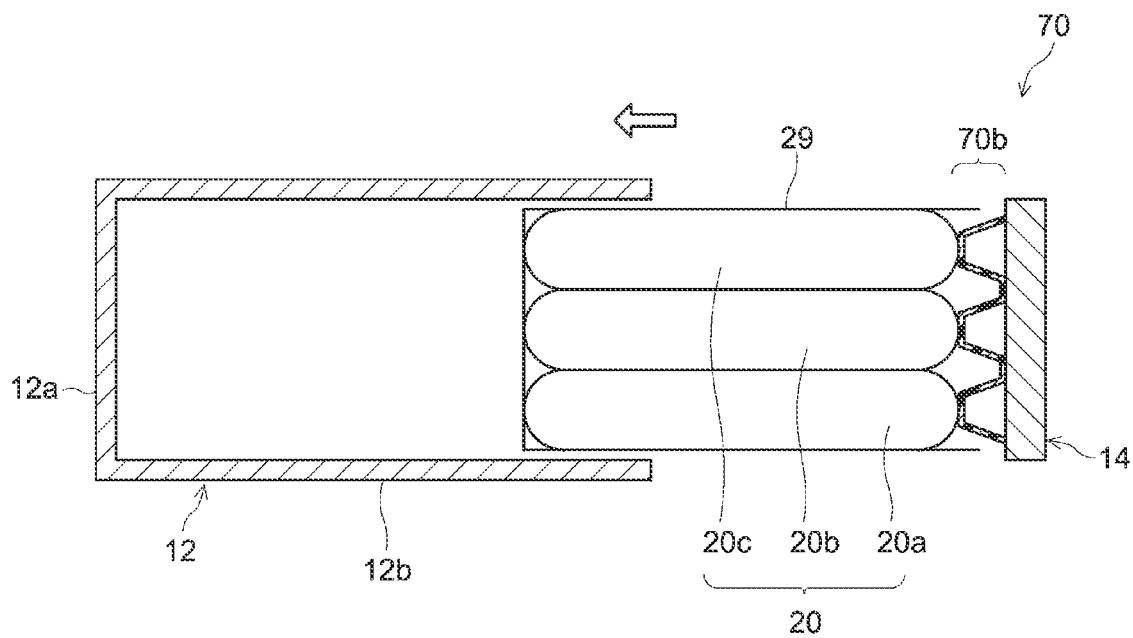
FIG. 14 is a cross section view that is schematically shown for explaining an insertion step of the battery in accordance with one embodiment.

In the insertion step, the second combined product manufactured at the second attaching step is accommodated in the internal space of the outer package 12. FIG. 14 is a cross section view that schematically explains the insertion step. In particular, at first, for example, a resin sheet consisting of a resin material, such as polyethylene (PE), and having an insulation property is folded and bent in a bag shape or a box shape, so as to prepare the electrode body holder 29. Next, the electrode body group 20 is accommodated in the electrode body holder 29. Then, the electrode body group 20 covered by the electrode body holder 29 is inserted into the outer package 12. In the case where the weight of the electrode body group 20 is heavy, in the case where the weight is approximately equal to or more than 1 kg, for example, equal to or more than 1.5 kg, or further 2 to 3 kg, as shown in FIG. 14, arrangement might be performed to make the longer side wall 12b of the outer package 12 cross the gravity direction (make the outer package 12 be placed sideways) so as to insert the electrode body group 20 into the outer package 12.

In the sealing step, the sealing plate 14 is joined to the edge part of the opening part 12h of the outer package 12 so as to seal the opening part 12h. The sealing step can be performed at the same time of performing the insertion step or after the insertion step. In the sealing step, it is preferable that the outer package 12 and the sealing plate 14 are welded and joined. Regarding welding and joining the outer package 12 and the sealing plate 14, it is possible, for example, to use laser welding, or the like. After that, the electrolyte is injected from the liquid injection hole 15, and then the liquid injection hole 15 is covered by the sealing member 16, so as to tightly seal the battery 100. As described above, it is possible to manufacture the battery 100.

The battery 100 can be used for various purposes, and it is possible to suitably use the battery for a purpose, for example, in which an external force, such as vibration and impact, might be applied, and thus, for example, it is possible to suitably use the battery as a power source (power supply for driving) for a motor mounted on a movable body (typically a vehicle, such as passenger car and truck). The kind of the vehicle is not particularly restricted, but it is possible to use it, for example, on a plug-in hybrid electric vehicle (PHEV), a hybrid electric vehicle (HEV), a battery electric vehicle (BEV), or the like. Regarding the battery 100, it is also possible to arrange a plurality of batteries 100 in a predetermined arrangement direction and then to apply a load from the arrangement direction by a binding mechanism so as to suitably implement a battery pack.

Some embodiments of the present disclosure are explained above, but the above described embodiments are merely examples. The present disclosure can be implemented in other various forms. The present disclosure can be executed based on the contents disclosed in the present specification, and the technical common sense in the present field. The technique recited in the appended claims includes variously deformed or changed versions of the embodiments that have been illustrated above. For example, one part of the above described embodiment can be replaced with another deformed aspect, and furthermore another deformed aspect can be added to the above described embodiment. In addition, unless a technical feature is explained to be essential, this technical feature can be appropriately deleted.

Figure 15:
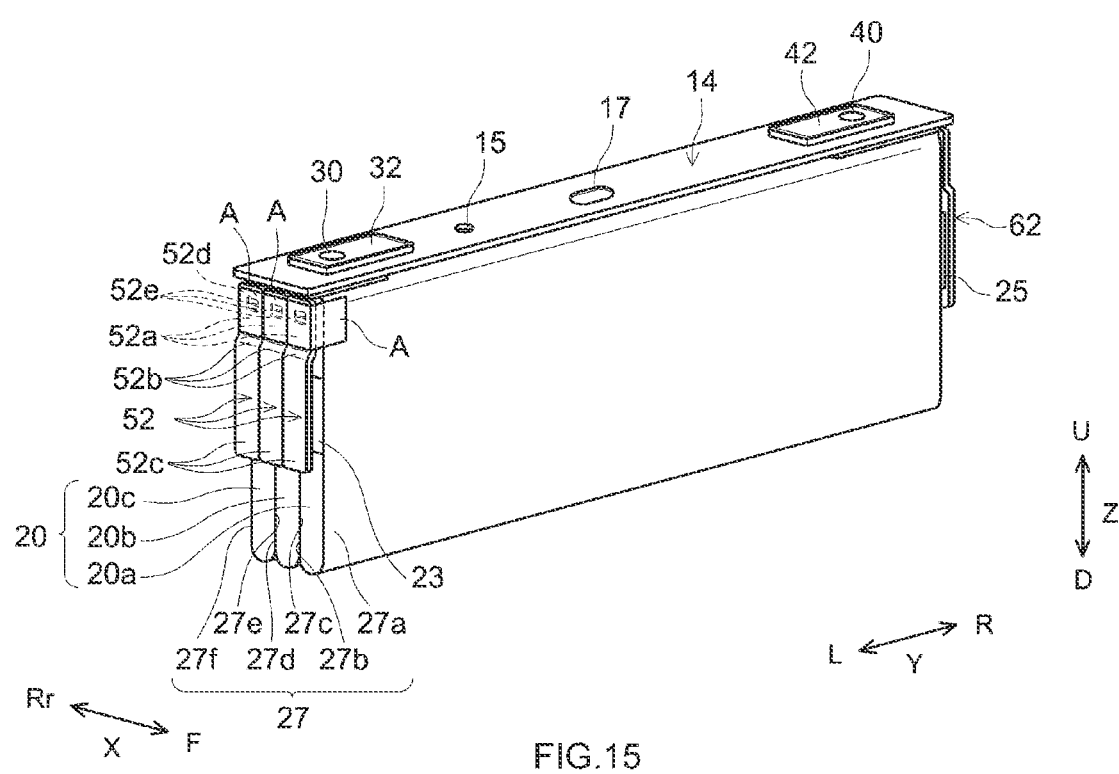
FIG. 15 is an explanation view that is schematically shown for explaining the battery in accordance with another embodiment.

For example, as shown in FIG. 15, it is possible to arrange a fixing member A for the electrode bodies 20a, 20b, 20c satisfying D1>D2. In FIG. 15, the fixing member A is arranged, from one flat outside surface 27a among flat outside surfaces of the electrode body 20a to the positive electrode second collector part 52 and then to the other flat outside surface 27b, in Japanese Katakana character "ko" shape. Similar configurations can be applied for the other electrode bodies 20b, 20c, too. Incidentally, reference numbers 27c and 27d in FIG. 15 represent the flat outside surfaces of the electrode body 20b, and reference numbers 27e and 27f represent the flat outside surfaces of the electrode body 20c. In accordance with such a configuration, for example, it is possible to suitably inhibit the electrode bodies 20a, 20b, 20c from being deviated from predetermined arrange positions in response to the external force applied to the longitudinal direction of the electrode bodies. By doing this, it is possible to suitably inhibit the damage on the electrode tab group, and thus it is preferable. Incidentally, the fixing member as described above can be suitably arranged after the complex product shown in FIG. 9 is manufactured.

As the fixing member A, it is possible to preferably use a member including, for example, a base material and an adhesion layer formed on the base material. As an example of the above described base material, it is possible to use polyethylene (PE), polypropylene (PP), polyester, nylon, vinyl chloride, Teflon (registered trademark), polyimide, kapton (registered trademark), polyphenylene sulfide, polyethylene naphthalate, or the like. The thickness of the above described base material is not particularly restricted if the effect of the technique herein disclosed is implemented, but the thickness can be approximately 5 µm to 100 µm, or preferably 10 µm to 50 µm. In addition, as an example of the material configuring the above described adhesion layer, it is possible to use acrylic adhesion material, silicon-type adhesion member, rubber adhesion member, or the like. It is preferable that the above described adhesion layer has a adhesive property at room temperature (typically, about 20° C.). The thickness of the above described adhesion layer is not particularly restricted if the effect of the technique herein disclosed is implemented, but the thickness can be approximately 5 µm to 100 µm, or preferably 5 µm to 20 µm.

Incidentally, the fixing member might be arranged from one flat outside surface to the negative electrode second collector part and then to the other flat outside surface, or can be combined with this kind of aspect and the above described aspect. In addition, the fixing member might be arranged from one flat outside surface to the positive electrode second collector part or to the negative electrode second collector part in a L shape.

The invention claimed is:

1. A battery, comprising:
one or a plurality of electrode bodies each provided with a positive electrode and a negative electrode; and
a battery case accommodating the electrode body,
wherein the battery case comprises:
an outer package that comprises:
a bottom wall,
a pair of first side walls extending from the bottom wall and being mutually opposed,
a pair of second side walls extending from the bottom wall and being mutually opposed, and
an opening part being opposed to the bottom wall; and
a sealing plate that seals the opening part,
a positive electrode terminal and a negative electrode terminal are attached to the sealing plate,
the electrode body comprises:
a first end part existing in a surface direction along the first side wall and a positive electrode tab group that is configured with a plurality of positive electrode tabs protruding from the first end part, each tab being configured with aluminum or aluminum alloy; and
a second end part existing in a surface direction along the first side wall and being different from the first end part and a negative electrode tab group that is configured with a plurality of negative electrode tabs protruding from the second end part, each tab being configured with copper or copper alloy,
a thickness of each of the positive electrode tabs configuring the positive electrode tab group is larger than a thickness of each of the negative electrode tabs configuring the negative electrode tab group,
the positive electrode tab group and the positive electrode terminal are electrically connected via a positive electrode electrical collector part, and
the positive electrode electrical collector part comprises a first region and a second region, the first region and the second region being disposed so as to face the second side wall of the battery case, and in a direction perpendicular to the second side wall, a shortest distance between the second side wall and the first region is smaller than a shortest distance between the second side wall and the second region, and the positive electrode tabs are connected to the first region and the positive electrode electrical collector part comprises a positive electrode tab join part in which a tip end portion of the positive electrode tab group is joined in a state of being bent so as to be arranged along the second side wall, the negative electrode tab group and the negative electrode terminal are electrically connected via a negative electrode electrical collector part, the negative electrode electrical collector part comprises a negative electrode tab join part in which a tip end portion of the negative electrode tab group is joined in a state of being bent so as to be arranged along the second side wall, and in a case where a length of an interval from the first end part to the positive electrode tab join part in the surface direction is treated as D1 and a length of an interval from the second end part to the negative electrode tab join part in the surface direction is treated as D2, D1>D2 is satisfied.

2. The battery according to claim 1,
wherein the positive electrode tab group is joined to a surface of the positive electrode electrical collector part at a side of the electrode body, and
the negative electrode tab group is joined to a surface of the negative electrode electrical collector part at a side of the electrode body.

3. The battery according to claim 1,
wherein a number of the positive electrode tabs configuring the positive electrode tab group is smaller than a number of the negative electrode tabs configuring the negative electrode tab group.

4. The battery according to claim 1,
wherein the positive electrode comprises:
a positive electrode electrical collector body that is long; and
the positive electrode tabs formed at a plurality of positions along the longitudinal direction of the positive electrode electrical collector body,
a positive electrode active material layer is formed on the positive electrode electrical collector body, a positive electrode protective layer is formed on a portion along an end part of the positive electrode active material layer and on the positive electrode tabs, and
the negative electrode comprises:
a negative electrode electrical collector body that is long; and the negative electrode tabs formed at a plurality of positions along the longitudinal direction of the negative electrode electrical collector body; and
a negative electrode active material layer is formed on the negative electrode electrical collector body and on the negative electrode tabs.

5. The battery according to claim 4,
wherein a length of a formed portion of the positive electrode protective layer in a protruding direction of the positive electrode tabs is shorter than a length of a formed portion of the negative electrode active material layer in a protruding direction of the negative electrode tabs.

6. The battery according to claim 1,
wherein the electrode body comprises a pair of flat outside surfaces, and
a fixing member is at least arranged from one flat outside surface among the flat outside surfaces to the positive electrode electrical collector part or the negative electrode electrical collector part.

7. The battery according to claim 1, further comprising an insulating member that insulates the sealing plate and the positive electrode electrical collector part or the negative electrode electrical collector part,
wherein the insulating member comprises:
a base part that is arranged between the sealing plate and the positive electrode electrical collector part or the negative electrode electrical collector part; and
one or a plurality of protruding parts that are provided at a center side of the electrode body in the surface direction more than the base part, and that protrude from a side of the sealing plate and to a side of the electrode body.

8. The battery according to claim 1,
wherein the positive electrode electrical collector part further comprises a third region coupling the first region and the second region, the third region being inclined with respect to the first region and to the second region.

9. The battery according to claim 1,
wherein the positive electrode electrical collector part is a bent plate-like member and includes a stepped portion between the first region and the second region.

10. The battery according to claim 1,
wherein the negative electrode electrical collector part comprises a first portion arranged between the sealing plate and the electrode body, and
comprises an insulating member being arranged between the sealing plate and the electrode body, and the insulating member includes a second portion,
the second portion is located closer to the center side than an end portion of the first portion that is closer to the center in the longitudinal direction of the sealing plate, and
in a direction perpendicular to the sealing plate, a shortest distance between the second portion and the electrode body is smaller than a shortest distance between the first portion and the electrode body.

11. The battery according to claim 1,
wherein the electrode body is a wound electrode body, and a plurality of the electrode bodies are arranged inside the battery case.

* * * * *